(12) United States Patent
Jung et al.

(10) Patent No.: US 11,355,764 B2
(45) Date of Patent: Jun. 7, 2022

(54) DEVICE FOR REMOVING RESIDUAL HYDROGEN IN FUEL CELL

(71) Applicant: Hyundai Motor Company, Seoul (KR)

(72) Inventors: Sekwon Jung, Gyeonggi-Do (KR); Hojune Bae, Gyeonggi-Do (KR); Hyunjoon Lee, Gyeonggi-Do (KR); HyunJae Lee, Seoul (KR); Deukkuen Ahn, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 864 days.

(21) Appl. No.: 14/565,106

(22) Filed: Dec. 9, 2014

(65) Prior Publication Data

US 2015/0311544 A1 Oct. 29, 2015

(30) Foreign Application Priority Data

Apr. 23, 2014 (KR) .................. 10-2014-0048434

(51) Int. Cl.
| | |
|---|---|
| *H01M 8/04* | (2016.01) |
| *H01M 8/24* | (2016.01) |
| *H01M 8/22* | (2006.01) |
| *H01M 8/04089* | (2016.01) |
| *H01M 8/04228* | (2016.01) |
| *H01M 8/04223* | (2016.01) |

(Continued)

(52) U.S. Cl.
CPC ....... *H01M 8/04089* (2013.01); *B60L 3/0053* (2013.01); *B60L 58/30* (2019.02); *H01M 8/04228* (2016.02); *H01M 8/04231* (2013.01); *H01M 2250/20* (2013.01); *Y02P 70/50* (2015.11); *Y02T 90/40* (2013.01)

(58) Field of Classification Search
CPC ......... H01M 8/04089; H01M 8/04228; H01M 8/04231
USPC .......................................................... 429/444
See application file for complete search history.

(56) References Cited

U.S. PATENT DOCUMENTS

2005/0077364 A1* 4/2005 Hwang ............ H01M 8/04768
236/44 C
2007/0246295 A1* 10/2007 Aso ..................... B60L 11/1881
181/256

(Continued)

FOREIGN PATENT DOCUMENTS

CN 102820477 A 12/2012
JP S5849301 A 3/1983

(Continued)

*Primary Examiner* — Cynthia H Kelly
*Assistant Examiner* — Julian Anthony
(74) *Attorney, Agent, or Firm* — Fox Rothschild LLP (57) ABSTRACT

Disclosed is a device for removing residual hydrogen in a fuel cell. The device for removing residual hydrogen in a fuel cell sucks residual hydrogen gas in a fuel cell system and easily removes the sucked hydrogen gas so as to prevent a fire, an explosion, and the like which may occur due to residual hydrogen in the fuel cell system during maintenance work of a fuel cell vehicle. In particular, the device may be manufactured as a simple ejector structure in which a nozzle, a venturi, and a diffuser are sequentially combined, the nozzle and the venturi are combined, and the like to use compressed air as a driving flow and use gas inside a fuel cell system as a suction flow and thus easily remove the residual hydrogen.

18 Claims, 7 Drawing Sheets

(51) Int. Cl.
*B60L 3/00* (2019.01)
*B60L 58/30* (2019.01)

(56) References Cited

U.S. PATENT DOCUMENTS

| | | | | |
|---|---|---|---|---|
| 2010/0279191 | A1* | 11/2010 | Matsuura | H01M 8/0662 429/443 |
| 2012/0258376 | A1* | 10/2012 | Cherchi | H01M 8/04097 429/415 |
| 2012/0315559 | A1* | 12/2012 | Noh | H01M 8/04097 429/431 |
| 2013/0149620 | A1* | 6/2013 | Fabian | H01M 8/04082 429/416 |
| 2014/0141345 | A1* | 5/2014 | Morita | H01M 8/04097 429/415 |
| 2014/0147760 | A1* | 5/2014 | Ohgami | H01M 8/04097 429/415 |
| 2014/0287334 | A1* | 9/2014 | Noh | H01M 8/2465 429/429 |

FOREIGN PATENT DOCUMENTS

| | | |
|---|---|---|
| JP | 08-252424 A | 10/1996 |
| JP | 10-323554 A | 12/1998 |
| JP | 2003-056800 A | 2/2003 |
| JP | 2003-203655 A | 7/2003 |
| JP | 2004-234863 A | 8/2004 |
| JP | 2005-180326 A | 7/2005 |
| JP | 2009-117189 A | 5/2009 |
| JP | 2011-003406 A | 1/2011 |
| KR | 20-0176542 Y1 | 1/2000 |
| KR | 20-0237876 Y1 | 6/2001 |
| KR | 10-2006-0040302 A | 5/2006 |
| KR | 10-2007-0117647 A | 12/2007 |
| KR | 10-2009-0007013 A | 1/2009 |
| KR | 10-2009-0098317 A | 9/2009 |
| KR | 10-0969064 B1 | 7/2010 |

* cited by examiner

DEVICE FOR REMOVING RESIDUAL HYDROGEN IN FUEL CELL

CROSS-REFERENCE TO RELATED APPLICATION

This application claims under 35 U.S.C. § 119(a) the benefit of Korean Patent Application No. 10-2014-0048434 filed on Apr. 23, 2014, the entire contents of which are incorporated herein by reference.

TECHNICAL FIELD

The present invention relates to a device for removing residual hydrogen in a fuel cell. The device for removing residual hydrogen in a fuel cell may suck residual hydrogen gas in a fuel cell system and easily remove the sucked hydrogen gas so as to prevent a fire, an explosion, and the like which may occur due to residual hydrogen in the fuel cell system during maintenance of a fuel cell vehicle.

BACKGROUND

A fuel cell system equipped in a fuel cell vehicle includes a hydrogen supply system supplying hydrogen as fuel to a fuel cell stack, an air supply system supplying oxygen in the air as an oxidant required for an electrochemical reaction to the fuel cell stack. In the fuel cell stack (hereinafter, also referred to as "stack") in which a plurality of unit cells are stacked and coupled to generate electricity by the electrochemical reaction of hydrogen and oxygen, heat and water management systems are provided to control an operating temperature of the stack and remove electrochemical reaction heat of the fuel cell stack, and the like.

The fuel cell system performs an operation of generating electricity using hydrogen and air or oxygen included in air as chemical reaction resources. Gaseous hydrogen may remain inside the fuel cell system due to diffusion of hydrogen during purging for removing impurities inside an anode of the stack or through a membrane electrode assembly of the stack in the operation process of the fuel cell system.

Figure 8:
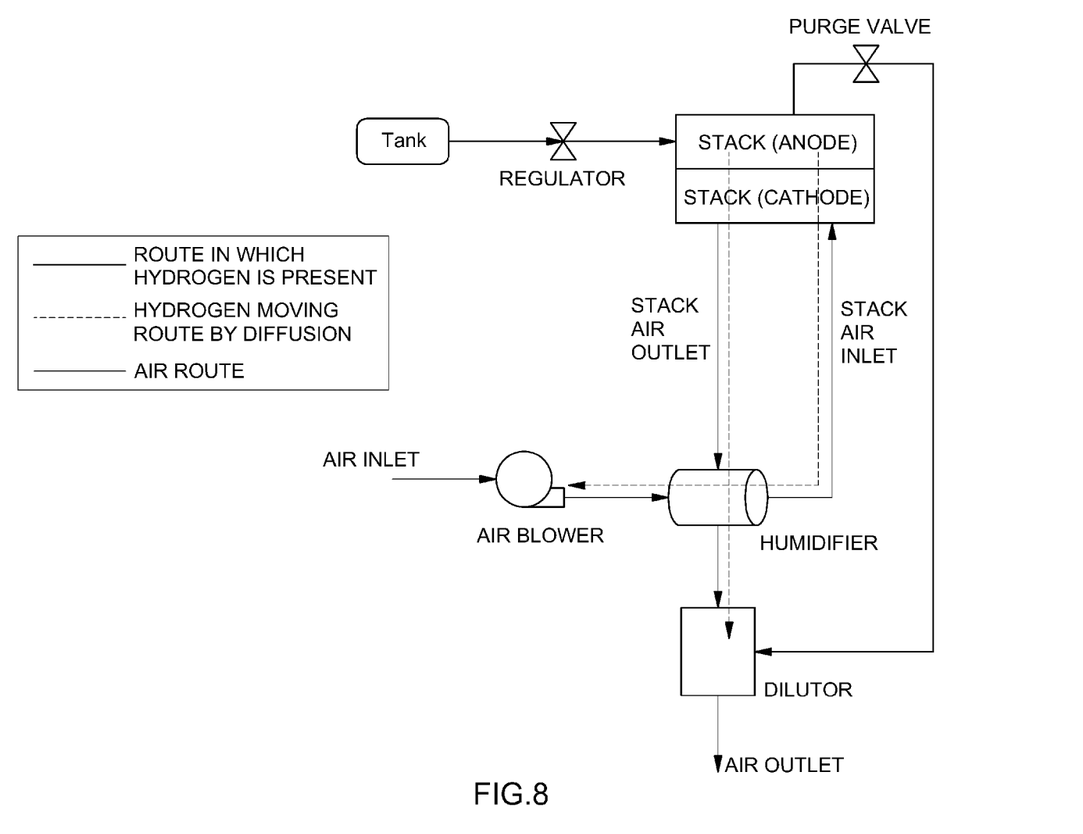
FIG. 8 illustrates an exemplary configuration of an exemplary fuel cell system.

The hydrogen may be discharged to the outside while being diluted during a general operation process but high-concentration hydrogen may locally exist inside the fuel cell system. For example, after the operation of the fuel cell system stops, the hydrogen remains in a hydrogen purge pipe, a dilutor as shown by a thick solid line in FIG. 8, and the like in addition to the anode of the stack. Further, the hydrogen inside the anode of the stack may move to a cathode due to a hydrogen purge process or a hydrogen diffusion phenomenon as shown by a dotted line in FIG. 8, such that the hydrogen may also be present in the cathode of the stack, an air suction pipe, and the like shown by a thin solid line in FIG. 8.

The hydrogen remaining inside the fuel cell system does not cause any problem under normal operating and stopping conditions of the fuel cell system but may bring about a fire when static electricity, frame, or the like occurs during a disassembling process of the system during maintenance or repair service.

Particularly, when the maintenance work of the fuel cell vehicle is performed in the state in which the residual hydrogen is present inside the fuel cell system, the hydrogen may combust and explode due to a spark, flame, or the like caused by the static electricity, and the like which may occur frequently during maintenance work, such that damage to the vehicle and an injury to a mechanic may be caused.

Accordingly, the maintenance work may be performed after removing the residual hydrogen inside the fuel cell system in terms of safety.

Usually, the combustion of hydrogen may be generated within a range in which the hydrogen concentration in the air ranges from about 4 to about 75%. When the hydrogen concentration inside the fuel cell system is reduced to be less than about 4% by sucking air into the stack while discharging the residual hydrogen gas inside the stack to the outside, a fire or an explosion may be prevented in a maintenance process of the fuel cell system.

Herein, various methods for removing residual hydrogen in a fuel cell system according to the related art will be described as follows.

A gas diffusion method has been used by waiting until a hydrogen gas concentration is reduced to be equal to or less than a combustion condition (4% to 75%) by diffusing hydrogen inside the fuel cell system to the outside, but this method may require substantial time depending on conditions and therefore may not be suitable during maintenance.

Alternatively, a method for performing hydrogen purging by injecting air into the fuel cell system and the stack may be used. However, this method may cause degradation in stack performance due to the introduction of oil such as lubricant of an air compressor, and the like, included in the high pressure air into the stack and consequently may require an expensive facility due to the installation of an expensive air filter at an automotive service center or a fuel cell system service center, periodic exchange of the air filter, and the like.

In addition, a method for performing hydrogen purging by injecting air or nitrogen and inert gas into the fuel cell system and the stack from the outside has been used. However, this method may include a separately expensive gas facility such as gasbombe and regulator and may require user efforts to additionally acquire gas handling permission, gas use authentication, and the like for performing process, and thus maintenance may not be performed when the exchange costs of the gasbombe periodically occur and gas is insufficient.

Moreover, the residual hydrogen may be removed by a method for sucking gas inside the fuel cell system and the stack using a vacuum pump, but an expensive vacuum pump may be required and such that costs may increase. In particular, the vacuum pump may be driven using electricity and may cause a fire or an explosion during the process of sucking gas including the residual hydrogen. In addition, the vacuum pump that includes an explosion-proof function may cost high and therefore, the vacuum pump may not be easily utilized and disposed in the service center.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention may provide technical solutions to the above-described technical difficulties in the related arts. Accordingly, a device for removing residual hydrogen in a fuel cell is provided. The device may be manufactured as a simple ejector structure in which a nozzle, a venturi, and a diffuser are sequentially combined, the nozzle and the venturi are combined, and the like to use compressed air as a driving flow or primary flow and use gas inside a fuel cell system as a suction flow or secondary flow, thereby easily removing the residual hydrogen.

In one aspect, a device for removing residual hydrogen in a fuel cell may include: a driving pipe reducing pressure while increasing a speed of a driving flow supplied from a driving flow supply source; and a suction pipe integrally connected to an inlet of the driving pipe to suck and guide a suction flow including the residual hydrogen in a fuel cell system to the driving pipe using energy of the driving flow.

In particular, an inner diameter portion of the driving pipe may be provided with a venturi whose diameter is gradually reduced and then constant. Alternatively, the inner diameter portion of the driving pipe may be formed in a structure in which a venturi whose diameter is gradually reduced and then constant and a diffuser whose diameter gradually increases are disposed on the same axis in parallel.

The inlet of the driving pipe may be further connected to a nozzle to inject the driving flow from the driving flow supply source into the driving pipe and an inlet of the nozzle may be press-fitted with a ring type elastic member into which an air gun tip is inserted to maintain an airtight state. Alternatively, the inlet of the driving pipe may be provided with a driving flow supply hole into which the air gun tip is directly inserted and an inner diameter portion of the driving flow supply hole may be press-fitted with a ring type elastic member into which an air gun tip is inserted to maintain an airtight state.

A distal end of the suction pipe may be integrally further connected to a flexible pipe which is connected to the fuel cell system and a distal end of the flexible pipe may be further connected to an adapter which is fastened to suit each gas suction position of the fuel cell system.

The inlet of the driving pipe may be connected to an inflated line having a quick connector for connecting the driving pipe to the driving flow supply source and an inflated line between the quick connector and the inlet of the driving pipe may be further provided with an on/off valve for permitting and cutting off a flow of the driving flow, and the inflated line between the on/off valve and the inlet of the driving pipe may be further provided with a regulator or a pressure gauge to check a flow pressure of the driving flow.

A discharge side of the driving pipe may be further provided with a muffler to reduce noise at the time of discharging the suction flow including the residual hydrogen from the suction pipe and in addition to the driving pipe and the suction pipe, the body portion of the muffler may be sealed with a case.

As such, the present invention may provide various advantages. For example, the residual hydrogen inside the fuel cell system may be easily removed by using the simple ejector structure in which the nozzle, the venturi, and the diffuser are sequentially combined or the nozzle and the venturi are combined. In addition, the manufacturing costs of the device for removing residual hydrogen in a fuel cell may be reduced and the device may be conveniently used by a mechanic to remove residual hydrogen in a fuel cell due to simplified structure thereof. The mechanic may easily perform the hydrogen removal work since the device for removing residual hydrogen in the fuel cell has a reduced size and thus is conveniently portable. Moreover, the safety of the maintenance work may be improved without a fire risk since electricity is not used during the maintenance process of removing hydrogen. The pressurized air or the pressurized/high pressure gas held in the general service center may be used as the driving flow for removing hydrogen and therefore the separate driving flow supply facility may not be required. Further, stack performance may be prevented from being degraded due to foreign materials since the foreign materials may not be introduced into the fuel cell system during the maintenance process for removing hydrogen.

Further provided are fuel cell systems that comprise a device to remove residual hydrogen in a fuel cell as disclosed herein. Still further provided are vehicles including automotive vehicles that comprise a device remove residual hydrogen in a fuel cell as disclosed herein. Also provided are vehicles including automotive vehicles that comprise a fuel cell system as disclosed herein. Other aspects and exemplary embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Reference numerals set forth in the Drawings includes reference to the following elements as further discussed below:

10: ejector
  12: driving pipe
  14: suction pipe
  16: venturi
  18: diffuser
  20: nozzle
  22: elastic member
  24: air gun tip
  26: driving flow supply hole
  28: flexible pipe
  30: adapter
  32: inflated line 34: quick connector
36: on/off valve
38: regulator or pressure gauge
40: muffler
42: case It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

The term "service center", as used herein, refers to a place or facility where a vehicle including a fuel cell vehicle receives maintenance services or repair services.

The term "mechanic", as used herein, refers to a subject performing maintenance services or repair services.

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings.

The present invention may allow a mechanic to easily suck and remove residual hydrogen, and the like in a fuel cell system using conveniently portable device for removing residual hydrogen in a fuel cell, for example, when the fuel cell system equipped in a fuel cell vehicle is repaired and checked.

First Exemplary Embodiment

Figure 1:
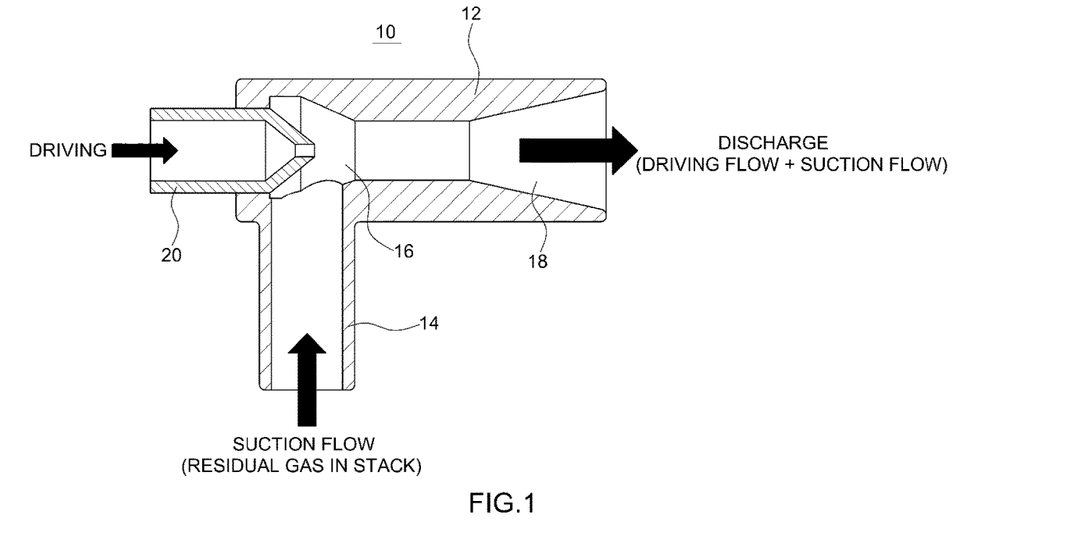
FIG. 1 illustrates a cross-sectional view of an exemplary device for removing residual hydrogen in a fuel cell according to a first exemplary embodiment of the present invention.

FIG. 1 illustrates a cross-sectional view of an exemplary device for removing residual hydrogen in a fuel cell according to a first exemplary embodiment of the present invention.

As illustrated in FIG. 1, the device for removing residual hydrogen in a fuel cell according to the exemplary embodiment of the present invention may be provided in an ejector 10 structure in which a driving pipe 12 and a suction pipe 14 are integrally connected and form a right (90°) angle.

An inlet of the driving pipe 12 may be connected to a driving flow supply source, for example, compressed air supply source to which an air gun of a service center is connected may be used. An outlet thereof may be a part which communicates with outside air to serve to reduce pressure while increasing a flow speed of a driving flow or primary flow which is pressurized air or pressurized gas supplied from the driving flow supply source.

Accordingly, an inner diameter portion of the driving pipe 12 may be provided with a venturi 16 and a diffuser 18 in parallel along a direction in which the driving flow is introduced and discharged. In particular, the inner diameter portion of the driving pipe 12 may be provided with the venturi 16 whose diameter may be gradually reduced and then constant and the diffuser 18 whose diameter may gradually increase again at an ending point of the venturi 16 and the venturi 16 and the venturi 18 may be provided in parallel.

The suction pipe 14 may be integrally molded at one end of the driving pipe 12 so as to communicate with the driving pipe 12 while being vertical to the driving pipe 12 and a lower end thereof may be coupled with a position at which the hydrogen in the fuel cell system may be discharged.

In more detail, the suction pipe 14 may be integrally with the venturi 16 molded so as to communicate with an inlet of the venturi 16 of the driving pipe 12 and the lower end thereof may be coupled with a position at which the hydrogen in the fuel cell system may be discharged by a fitting member, an adapter, and the like.

In particular, the position at which the hydrogen in the fuel cell system may be discharged may be provided with an air inlet and an air outlet (or tail pipe in a fuel cell vehicle) of a stack, a water discharge hole in the tail pipe, a service port of the fuel cell system, an anode purge pipe or an anode drain pipe of the stack, a hydrogen connecting pipe of the anode, a connecting pipe of a hydrogen storage apparatus (or hydrogen tank), a service port, and the like.

Meanwhile, the inlet of the driving pipe 12 may be separably coupled with or integrally molded with a nozzle 20 whose diameter may be constant and then gradually reduced, in which a tip of the nozzle 20 may be disposed at the inlet of the venturi 16 in the driving pipe 12.

As such, when an inlet of the nozzle 20 is connected to a driving flow supply source and the lower end of the suction pipe 14 is coupled with a position at which the hydrogen in the fuel cell system may be discharged, the driving flow which is pressurized air or pressurized gas supplied from the driving flow supply source may be supplied to the driving pipe 12. Subsequently, the driving flow may be introduced into the fuel cell system through the inlet of the driving pipe 12 and then may pass through the venturi 16, and thus, a flow speed of the driving flow may increase. Simultaneously, a pressure thereof may decrease and the driving flow continuously passing through the venturi may be easily discharged to outside air as being diffused through the diffuser 18.

At the same time, as the pressure of the driving flow is reduced when the driving flow passes through the venturi 16, the residual hydrogen in the fuel cell system connected to the suction pipe 14 may be instantly sucked into the venturi 16 having the reduced pressure, such that the suction flow which is the residual hydrogen may be input to the venturi 16 while being sucked through the suction pipe 14 and thus may be easily discharged to the outside air through the diffuser 18 along with the driving flow.

According to the first exemplary embodiment of the present invention, the ejector 10 may include the driving pipe 12 which includes the nozzle 20/venturi 16/diffuser 18 and the suction pipe 14 which is formed to communicate with the driving pipe 12 so as to be connected to the fuel cell system. As such, a fire or an explosion due to hydrogen combustion which may occur during a maintenance process of the fuel cell system may be easily prevented by a mechanic easily discharging the residual hydrogen gas in the fuel cell system including the stack to the outside using the ejector 10.

Second Exemplary Embodiment

Figure 2:
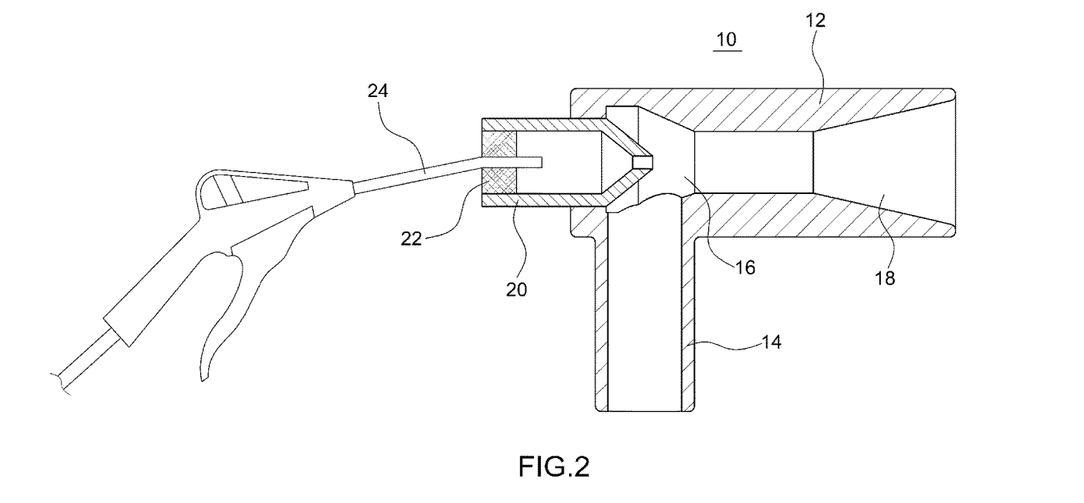
FIG. 2 illustrates a cross-sectional view of an exemplary device for removing residual hydrogen in a fuel cell according to a second exemplary embodiment of the present invention.

FIG. 2 illustrates a cross-sectional view of an exemplary device for removing residual hydrogen in a fuel cell according to a second exemplary embodiment of the present invention.

The device for removing residual hydrogen according to the second exemplary embodiment of the present invention may have the same configuration of the first exemplary embodiment of the present invention, but the second exemplar embodiment may further include a unit for maintaining an airtight state when the driving flow is supplied only to the nozzle 20.

In particular, an inlet of the nozzle 20 may be press-fitted with a ring type elastic member 22 for maintaining an airtight state in the state in which the inlet of the driving pipe 12 is separably fastened with or integrally formed with the nozzle 20 to inject the driving flow from the driving flow supply source into the driving pipe 12. In this case, an inner diameter portion of the elastic member 22 may be inserted with an air gun tip (24) connected to the driving flow supply source so as to be able to maintain an airtight state.

When the driving flow which is the pressurized air or the pressurized gas supplied from the driving flow supply source is supplied into the nozzle 20 through the air gun tip 24 in the state in which the inner diameter portion of the elastic member 22 press-fitted in the nozzle 20 is press-fitted with the air gun tip 24 connected to the driving flow supply source and the lower end of the suction pipe 14 is coupled at the position at which the hydrogen in the fuel cell system may be discharged, the elastic member 22 may provide the airtight state maintaining function.

As such, the driving flow may not leak to the outside at all due to the airtight state maintaining function of the elastic member 22 and may easily flow in the venturi 16 in the driving pipe 12 through the nozzle 20, and thus, the flow speed may smoothly increase and simultaneously, the pressure may be smoothly reduced at the moment that the driving flow passes through the venturi 16. As consequence, the residual hydrogen gas in the fuel cell system may be more smoothly sucked through the suction pipe 14.

Third Exemplary Embodiment

Figure 3:
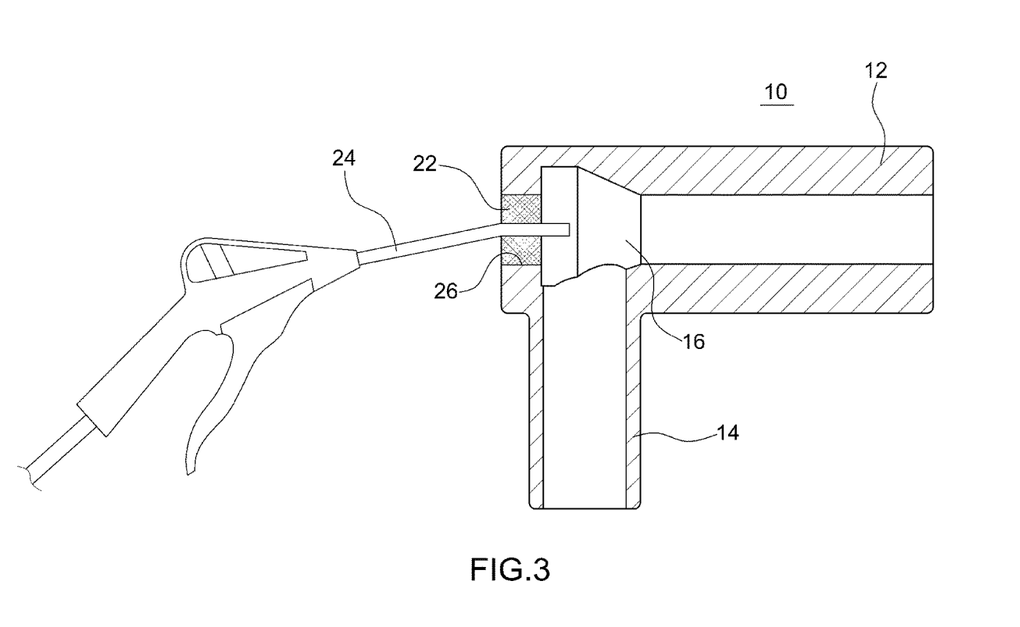
FIG. 3 illustrates a cross-sectional view of an exemplary device for removing residual hydrogen in a fuel cell according to a third exemplary embodiment of the present invention.

FIG. 3 illustrates a cross-sectional view of an exemplary device for removing residual hydrogen in a fuel cell according to a third exemplary embodiment of the present invention.

As illustrated in FIG. 3, the apparatus for removing residual hydrogen according to the third exemplary embodiment of the present invention may be same as that of the first exemplary embodiment of the present invention, such that the device for removing residual hydrogen in a fuel cell may be provided with the ejector 10 structure in which the driving pipe 12 and the suction pipe 14 are integrally connected as forming a right (90°) angle.

In addition, the device for removing residual hydrogen in a fuel cell according to the third exemplary embodiment of the present invention may have simplified structure.

The inlet of the driving pipe 12 may be connected to the driving flow supply source such as compressed air supply source to which the air gun of a service center is connected and the outlet thereof may be a part which communicates with external air to serve to reduce pressure while increasing the flow speed of the driving flow or primary flow which is the pressurized air or the pressurized gas supplied from the driving flow supply source.

In particular, the inner diameter portion of the driving pipe 12 according to the third exemplary embodiment of the present invention may be provided only with the venturi 16 whose diameter may be gradually reduced and then constant. Particularly, the inner diameter portion of the driving pipe 12 may be provided with only the venturi 16 whose diameter may be gradually reduced and then constant but the nozzle and the diffuser according to the first exemplary embodiment may not be used.

In this case, the inlet of the driving pipe 12 may be provided with the driving flow supply hole 26 into which the air gun tip 24 is directly inserted and the inner diameter portion of the driving flow supply hole 26 may be press-fitted with the ring type elastic member 22 into which the air gun tip 24 for maintaining an airtight state is inserted.

The suction pipe 14 may be integrally molded with the venturi 16 so as to communicate with the inlet of the venturi 16 in the driving pipe 12 and the lower end thereof may be coupled at the position at which the hydrogen in the fuel cell system may be discharged.

Accordingly, when the driving flow which is the pressurized air or the pressurized gas supplied from the driving flow supply source is supplied into the venturi 16 of the driving pipe 12 through the air gun tip 24 in the state in which the inner diameter portion of the elastic member 22 is press-fitted with the air gun tip 24 connected to the driving flow supply source and the lower end of the suction pipe 14 is coupled at the position at which the hydrogen in the fuel cell system may be discharged, the elastic member 22 may provide the airtight state maintaining function.

Subsequently, the flow speed may increase, and simultaneously, the pressure may be reduced at the moment that the driving flow passes through the venturi 16 of the driving pipe 12 and the driving flow continuously passing through the venturi may be easily discharged to the outside air.

At the same time, as the pressure of the driving flow is reduced when the driving flow passes through the venturi 16, the residual hydrogen in the fuel cell system connected to the suction pipe 14 may be instantly sucked into the venturi 16 having the reduced pressure, such that a suction flow which is the residual hydrogen may be input to the venturi 16 as being sucked through the suction pipe 14 and thus the residual hydrogen may be easily discharged to the outside air along with the driving flow.

According to the third exemplary embodiment of the present invention, the simplified ejector 10 may include the driving pipe 12 including the venturi 16 and the suction pipe 18 which is formed to communicate with the driving pipe 12 so as to be connected to the fuel cell system. As such, a fire or an explosion due to the hydrogen combustion which may occur during a maintenance process of the fuel cell system may be easily prevented by a mechanic easily discharging the residual hydrogen gas in the fuel cell system including the stack to the outside.

Fourth Exemplary Embodiment

Figure 4:
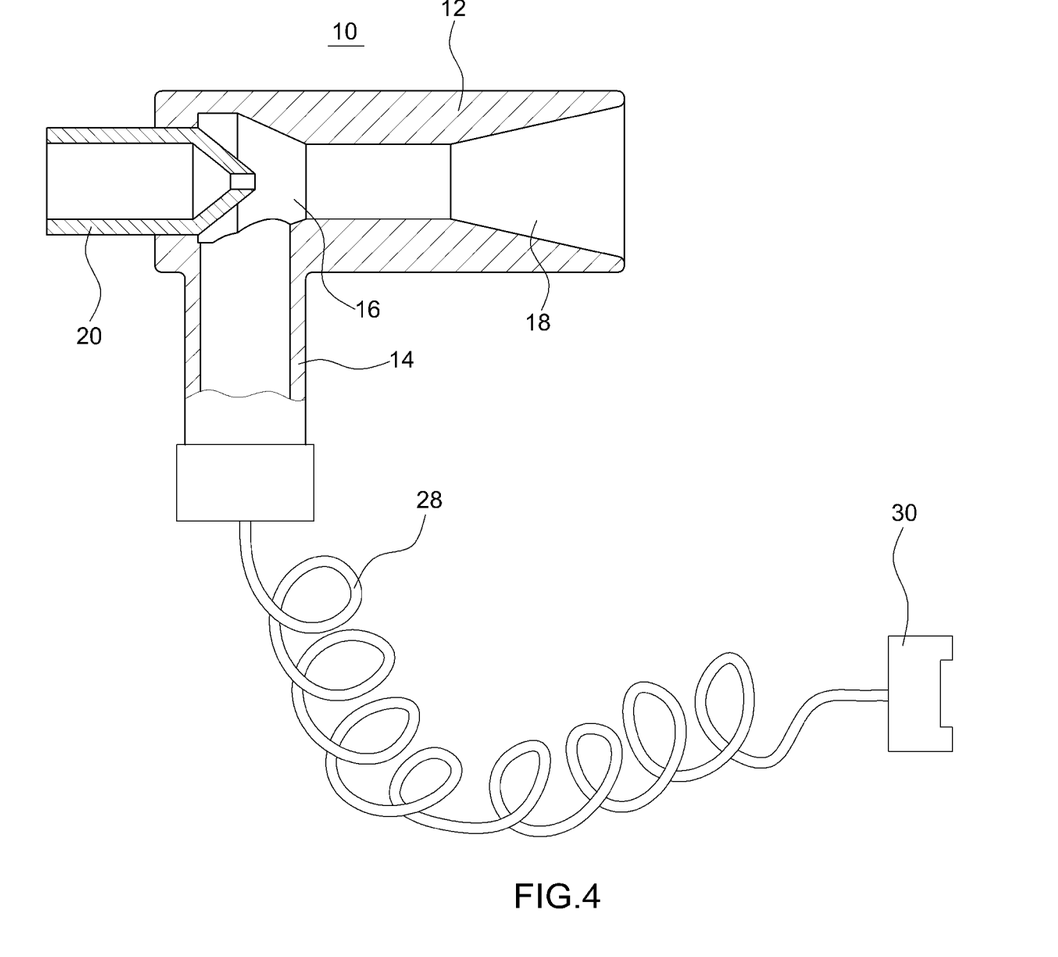
FIG. 4 illustrates a cross-sectional view of an exemplary device for removing residual hydrogen in a fuel cell according to a fourth exemplary embodiment of the present invention.

FIG. 4 is a cross-sectional view of an exemplary device for removing residual hydrogen in a fuel cell according to a fourth exemplary embodiment of the present invention.

The fourth exemplary embodiment of the present invention may include the ejector of the first to third exemplary embodiments of the present invention but may further include a unit to connect the suction pipe 14 to the position at which the residual hydrogen in the fuel cell system is discharged and the unit may be attached to the lower end of the suction pipe 14.

As described above, the position at which the hydrogen in the fuel cell system may be discharged may be provided with the air inlet and the air outlet (or tail pipe in the fuel cell vehicle) of the stack, the water discharge hole in the tail pipe, the service port of the fuel cell system, the anode purge pipe or the anode drain pipe of the stack, the hydrogen connecting pipe of the anode, the connecting pipe of the hydrogen storage apparatus (or hydrogen tank), the service port, and the like.

Since a distance to directly connect the suction pipe 14 to the position at which the hydrogen may be discharged may be substantial or the interference with peripheral parts, and the like may exist, a unit to easily connect the suction pipe 14 to the position at which the residual hydrogen in the fuel cell system is discharged may be additionally attached to the lower end of the suction pipe 14.

In particular, the lower end of the suction pipe 14 may be integrally connected to a flexible pipe 28 connected to the fuel cell system via a connector, and the like and a distal end of the flexible pipe 28 may be connected to the fitting member or the adapter 30 which is fastened to suit each gas suction position of the fuel cell system.

Accordingly, the mechanic may stretch the flexible pipe 28 connected to the lower end of the suction pipe 14 to extend to the position at which the residual hydrogen in the fuel cell system is discharged, and simultaneously may fasten the adapter 30 at the position at which the residual hydrogen of the fuel cell system is discharged, such that the suction pipe 14 may be easily connected to any position at which the residual hydrogen is discharged and then the residual hydrogen removing work may be easily performed.

Fifth Exemplary Embodiment and Sixth Exemplary Embodiment

Figure 5:
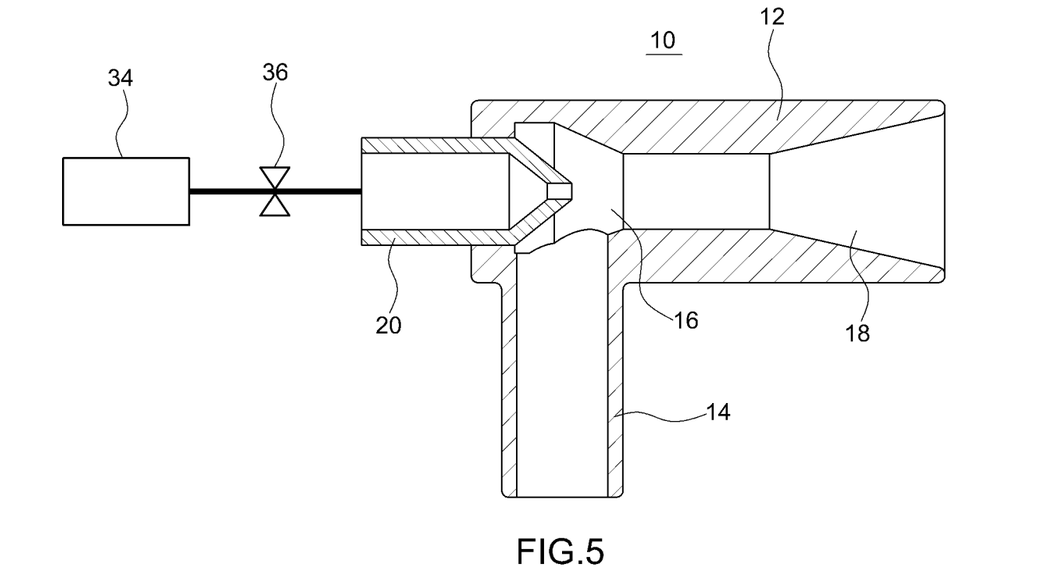
FIG. 5 illustrates a cross-sectional view of an exemplary device for removing residual hydrogen in a fuel cell according to a fifth exemplary embodiment of the present invention.
Figure 6:
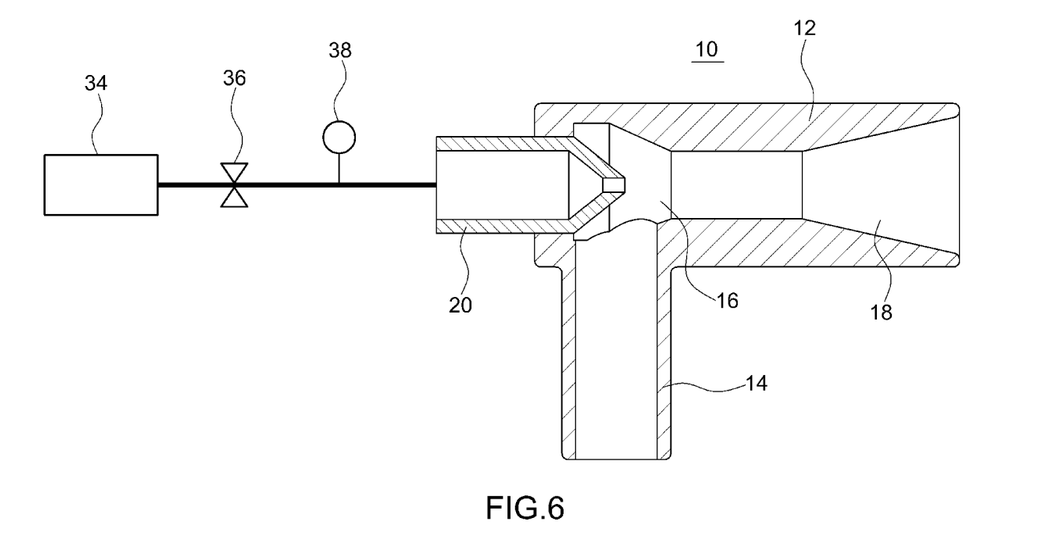
FIG. 6 illustrates a cross-sectional view of an exemplary device for removing residual hydrogen in a fuel cell according to a sixth exemplary embodiment of the present invention.

FIGS. 5 and 6 respectively show cross-sectional views of exemplary devices for removing residual hydrogen in a fuel cell according to fifth and sixth exemplary embodiments of the present invention.

The fifth exemplary embodiment of the present invention may be same as the first exemplary embodiment of the present invention but may further include an inflated line 32 between the quick connector 34 and the inlet of the driving pipe 12 in the fifth embodiment may be further provided with an on/off valve 36 for permitting and cutting off the flow of the driving flow in the state in which the inlet of the driving pipe 12 is connected with a first end of the inflated line 32 and a second end of the inflated line 32 is fastened with a quick connector 34 for connecting the inflated line to the driving flow supply source.

As the on/off valve 36, any valve which may permit or cut off the flow of a fluid such as a ball valve, a needle valve, a check valve, and a solenoid valve may be used without limitation.

Accordingly, when the user temporarily stops the residual hydrogen removing work when the driving flow is continuously supplied from the driving flow supply source to the inlet of the driving pipe 12, the work may stop by the simple operation of closing the on/off valve 36. Likewise, when the work starts, the work may start by the simple operation of opening the on/off valve 36 again.

According to the sixth exemplary embodiment of the present invention, the inflated line 32 between the on/off valve 36 and the inlet of the driving pipe 12 may be further provided with a regulator or a pressure gauge 38 for checking the flow pressure of the driving flow.

Therefore, when the ejector 10 is used according to the exemplary embodiment of the present invention while considering inflating ranges of the driving flow supply sources from difference service center are different, the actual supply pressure of the driving flow may be checked by the regulator or the pressure gauge 38, such that the case in which the sufficient suction for removing the residual hydrogen is not made due to the substantially reduced driving flow supply pressure of the driving flow supply source from a certain service center may be prevented earlier.

Seventh Exemplary Embodiment

Figure 7A:
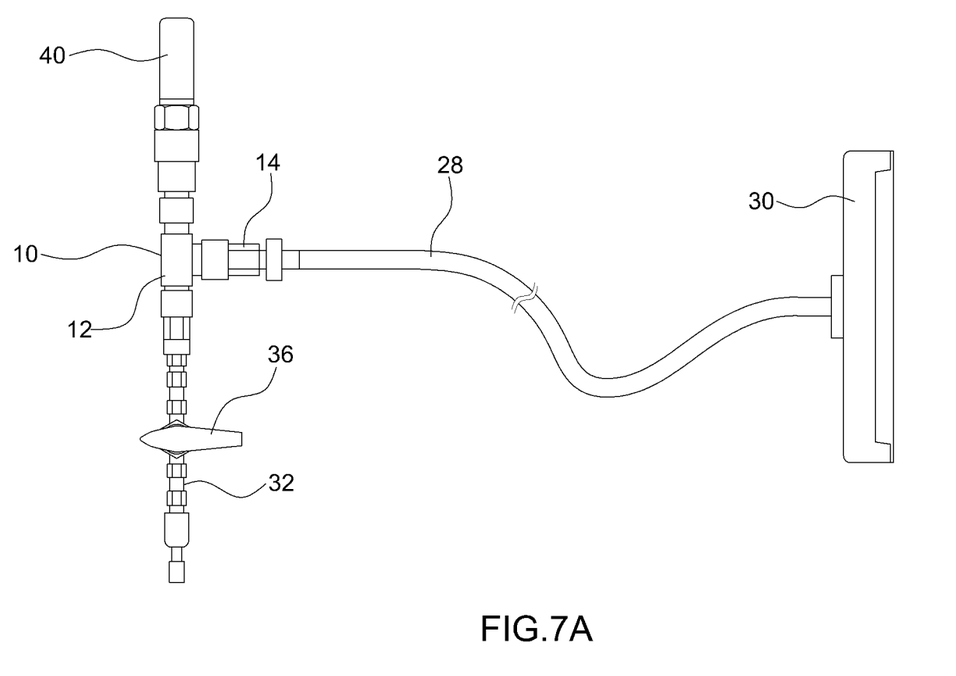
FIGS. 7A and 7B illustrate cross-sectional views of an exemplary device for removing residual hydrogen in a fuel cell according to a seventh exemplary embodiment of the present invention.
Figure 7B:
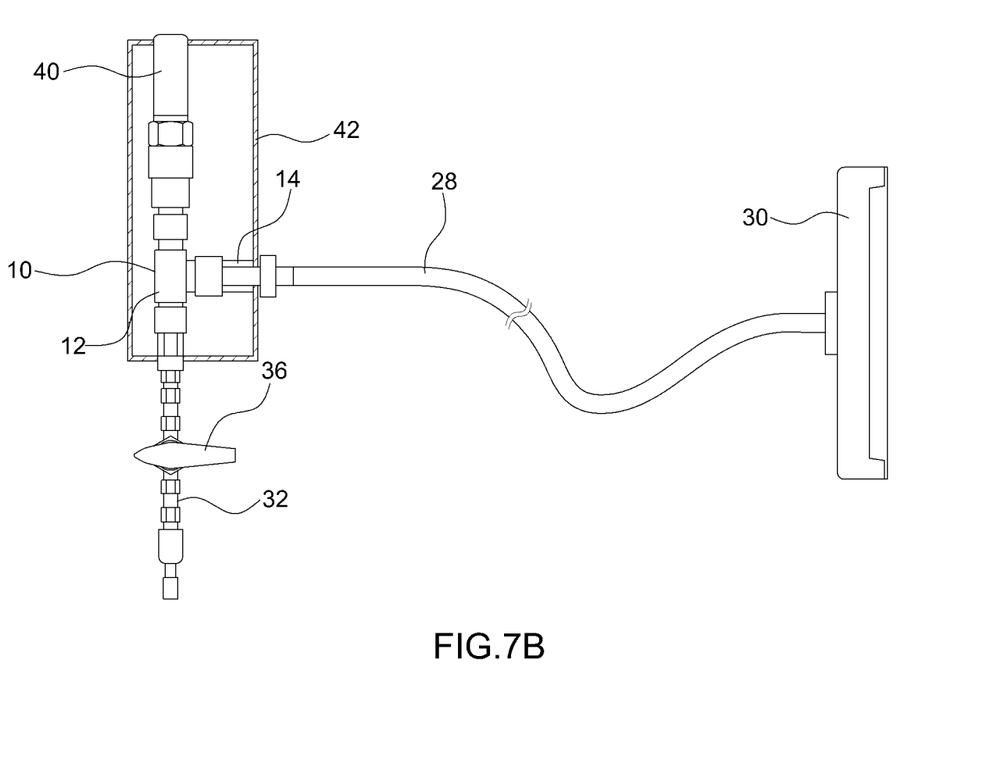

FIGS. 7A and 7B respectively show a plan view and a cross-sectional view of an exemplary device for removing residual hydrogen in a fuel cell according to a seventh exemplary embodiment of the present invention.

The seventh exemplary embodiment of the present invention may prevent workability from being degraded due to the discharge noise of gas, such as driving flow and residual hydrogen, discharged through the outlet of the driving pipe 12 which may be substantially loud during removing the residual hydrogen, the outlet of the driving pipe 12 may be further provided with a muffler 40 to reduce the discharge noise.

The outlet of the driving pipe 12 may be provided with the separate muffler 40 to reduce noise at the time of discharging a mixture of the suction flow and the driving flow, which include the residual hydrogen, from the suction pipe 14 as illustrated in FIG. 7B.

In particular, in addition to the driving pipe 12 and the suction pipe 14, a body portion of the muffler 40 may be enclosed with a separate noise blocking case 42 such that in addition to the driving pipe 12 and the suction pipe 14, the body portion of the muffler 40 may be inserted into the case 42.

Further, in addition to the driving pipe 12 and the suction pipe 14, the body portion of the muffler 40 may be enclosed with a noise absorbing material and then the muffler 40 may be inserted into the case opened to the outside through pores.

As such, the discharge noise of the gas (driving flow and residual hydrogen) discharged through the outlet of the driving pipe 12 may be reduced by the muffler 40 at the time of removing the residual hydrogen, and simultaneously, may be blocked by the noise blocking case 42, such that the working environment for the mechanic within the workplace may be improved.

According to various exemplary embodiments of the present invention, the driving flow supply performance and the suction flow sucking performance for removing residual hydrogen in the fuel cell system may be controlled under the condition that a hydrogen concentration is maintained to be about 4% or less in average or at maximum of about 8% or less, which may be achieved by a method for controlling a ratio between the driving flow and the suction flow by increasing the driving flow amount with increased diameter of the nozzle, reducing the suction flow amount, or the like.

The ratio between the driving flow and the suction flow may vary for each residual hydrogen concentration and each fuel cell system when the starting of the fuel cell vehicle stops, and when the ratio thereof is satisfied, the discharge gas including the residual hydrogen may be directly discharged at the service center thereby greatly increasing convenience of work.

On the other hand, when the hydrogen concentration is greater than about 4% in average or at a maximum of about 8%, the discharge gas may not be directly discharged inside the service center but the discharge gas may be discharged to the outside air by connecting the outlet of the driving pipe or the flexible tube connected to the outlet to a ventilation system included in the service center.

When the device for removing residual hydrogen according to various exemplary embodiments of the present invention is used, when a passage through which air or gas may be introduced into another side such as cathode of the stack in the fuel cell system is opened and thus outside air or gas may be introduced therethrough, the hydrogen concentration in the fuel cell system may be more rapidly reduced.

Further, when separate air may not be introduce into the fuel cell system, the hydrogen concentration in the fuel cell system may be further lowered by applying a method for temporarily stopping the injection of the driving flow, introducing outside air into the fuel cell system by reflowing outside air communicating with the insides of the driving pipe and the suction pipe, and then repeatedly injecting the driving flow again.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A portable device for maintenance in a fuel cell, comprising:
   a driving pipe configured to reduce pressure while increasing a speed of a driving flow supplied from a driving flow supply source;
   a suction pipe configured to be integrally connected to an inlet of the driving pipe to guide a suction flow including the residual hydrogen in a fuel cell system the driving pipe using energy of the driving flow;
   wherein the inlet of the driving pipe is further connected to a nozzle to inject the driving flow from the driving flow supply source into the driving pipe,
   wherein the suction pipe is coupled with a tail pipe which is an air outlet of stack at which hydrogen in the fuel cell system is discharged,
   wherein driving flow supply source is configured as a compressed air supply source,
   wherein the inlet of the driving pipe includes a driving flow supply opening.

2. The device of claim 1, wherein an inner diameter portion of the driving pipe is provided with a venturi having a diameter that gradually reduces and is then constant.

3. The device of claim 1, wherein an inner diameter portion of the driving pipe is formed in a structure in which a venturi has a diameter that gradually reduces and is then constant and a diffuser whose diameter is gradually increased are disposed on the same axis in parallel.

4. The device of claim 1, wherein an inlet of the nozzle is press-fitted with a ring type elastic member into which an air gun tip is inserted to maintain an airtight state.

5. The device of claim 1, wherein an air gun tip is directly inserted into the driving flow supply opening.

6. The device of claim 5, wherein an inner diameter portion of the driving flow supply opening is press-fitted with a ring type elastic member into which an air gun tip is inserted to maintain an airtight state.

7. The device of claim 1, wherein a distal end of the suction pipe is integrally further connected to a flexible pipe which is connected to the fuel cell system.

8. The device of claim 7, wherein a distal end of the flexible pipe is further connected to an adapter which is fastened to suit each gas suction position of the fuel cell system.

9. The device of claim 1 wherein the inlet of the driving pipe is connected to an inflated line having a quick connector to connect the driving pipe to the compressed air supply source and an inflated line between the quick connector and the inlet of the driving pipe includes an on/off valve configured to permit and cut off a flow of the driving flow.

10. The device of claim 9, wherein the inflated line between the on/off valve and the inlet of the driving pipe includes a regulator or a pressure gauge configured to detect a flow pressure of the driving flow.

11. The device of claim 1, wherein a discharge side of the driving pipe includes with a muffler configured to reduce noise when the suction flow including the residual hydrogen is discharged from the suction pipe.

12. The device of claim 11, wherein a body portion of the muffler is enclosed within a case with the driving pipe and the suction pipe.

13. The device of claim 11, wherein in addition to the driving pipe and the suction pipe, a body portion of the muffler is enclosed with a noise absorbing material and then is disposed within a case.

14. The device of claim 1, wherein when the suction flow including the residual hydrogen in the fuel cell system is discharged through the suction pipe along with the driving flow, a hydrogen concentration is adjusted to be about 4% or less in average or at maximum of about 8% or less and when the hydrogen concentration is greater than about 4% in average or at maximum of about 8% or greater, an outlet of the suction pipe is directly connected to a vent hole opening in a workplace.

15. A fuel cell system comprising the device of claim 1 to remove residual hydrogen in a fuel cell.

16. A vehicle comprising a fuel cell system of claim 15.

17. A portable device for maintenance in a fuel cell, comprising:
   a driving pipe;
   a suction pipe configured to be integrally connected to an inlet of the driving pipe to guide a suction flow including the residual hydrogen in a fuel cell system to the driving pipe using energy of the driving flow; and
   a compressed air supply source that serves as a driving flow supply source and connected to the inlet of the driving pipe, wherein an outlet of the compressed air supply source is in communication with outside air to increase a flow speed of a driving flow supplied from the compressed air supply source,
   wherein the inlet of the driving pipe is further connected to a nozzle to inject the driving flow from the compressed air supply source into the driving pipe, and wherein the suction pipe is coupled with a tail pipe which is an air outlet of the stack at which hydrogen in the fuel cell system is discharged.

18. A portable device for maintenance in a fuel cell, comprising:
   a driving pipe;
   a suction pipe configured to be integrally connected to an inlet of the driving pipe to guide a suction flow including the residual hydrogen in a fuel cell system to the driving pipe using energy of the driving flow; and
   a compressed air supply source connected to the inlet of the driving pipe, wherein an outlet of the compressed air supply source is in communication with outside air to increase a flow speed of a driving flow supplied from the compressed air supply source,
   wherein the inlet of the driving pipe is further connected to a nozzle to inject the driving flow from the compressed air supply source into the driving pipe,
   wherein the suction pipe is coupled with a tail pipe which is an air outlet of the stack at which hydrogen in the fuel cell system is discharged, and
   wherein an inlet of the nozzle is press-fitted with a ring type elastic member into which an air gun tip is inserted to maintain an airtight state.

* * * * *